(No Model.)

H. TIMKEN.
VEHICLE SPRING.

No. 487,202. Patented Nov. 29, 1892.

Attest:
Wm. M Eccles
H. H. Timken.

Inventor:
Henry Timken

UNITED STATES PATENT OFFICE.

HENRY TIMKEN, OF SAN DIEGO, CALIFORNIA.

VEHICLE-SPRING.

SPECIFICATION forming part of Letters Patent No. 487,202, dated November 29, 1892.

Application filed July 3, 1891. Serial No. 398,402. (No model.)

*To all whom it may concern:*

Be it known that I, HENRY TIMKEN, a citizen of the United States, residing at the city of San Diego, State of California, have invented certain new and useful Improvements in Vehicle-Springs, of which the following is a specification, reference being had to the accompanying drawings.

My invention relates to improvements in vehicle-springs; and it consists of the construction, arrangement, and combination of parts hereinafter described, and pointed out in the claims.

Figure 1:
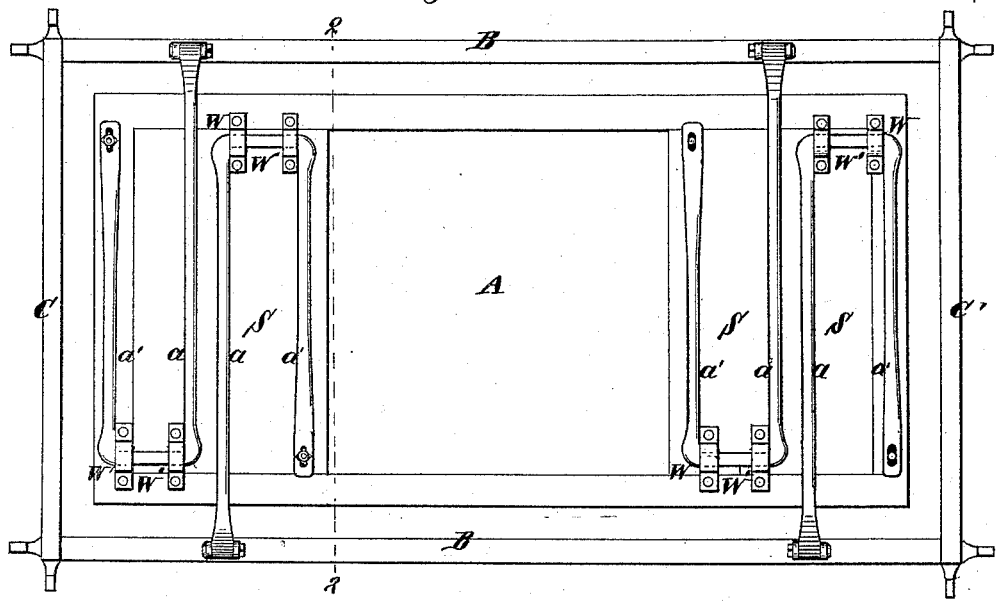
Figure 2:
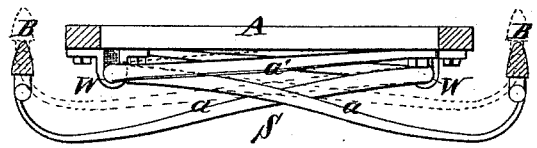
Figure 3:
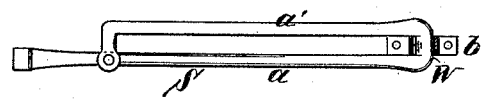

In the accompanying drawings, Figure 1 is a plan view of the under side of a side-bar vehicle with my springs attached. Fig. 2 is a vertical transverse sectional view of the same, taken on the line 2 2 of Fig. 1. Fig. 3 is a view of one of my springs detached with an elongated wrist connection or journal.

A represents the body of a vehicle.

B B are ordinary side bars supported by the head-block C and hind axle C'.

S S are springs connecting the body A to the running-gear. These springs may be arranged in pairs running transversely across the bottom of the body and connected with the side bars, as shown in Fig. 1, or they may be attached to the body, one at or near each of the four corners thereof and running longitudinally therewith and connected to the hind axle and head-block or to end springs, as desired.

Each of the springs S S is made, preferably, of a round piece of steel flattened at both ends, bent at or near its center so as to form the wrist W, uniting the two flexion-arms $a$ and $a'$, which extend laterally therefrom and preferably approximately in same direction with each other. The wrist W is preferably made so as to allow torsion action therein. Arm $a$ is attached at the outer end to the running-gear of the vehicle. The connecting-wrist W is journaled or otherwise so connected as to allow the same to turn to the body of the vehicle, either separated therefrom, as shown in Fig. 2, or closely joined thereto. Arm $a'$ rests at or near its outer end underneath the body of the vehicle in appropriate rests or bearings in such manner that the said arm will be free to flex. The flexing of the arm has the effect of changing the distance between the end of the arm and the wrist portion, and in order to permit this flexing either the end of the arm must be free to move toward the wrist portion or the wrist portion must be free to move toward the end of the arm. In the construction shown in Figs. 1 and 2 the end of the arm rests against the under side of the vehicle-body or bearings thereon without any fastening device or is held in position by any suitable fastening which will permit free longitudinal movement of said end. In the construction shown in Fig. 3 the journal or support has the open space in which the wrist portion rests elongated to permit lateral movement of said wrist, and in this case the end of the arm may be fixedly secured to the vehicle-body, as the shape of the journal bearing or support permits the reciprocating movement of the wrist portion which the flexing of the arm requires. When the support for the wrist has the elongated open space, it is preferable, but not necessary, to fasten the outer end of the arm fixedly to the wagon-body in order to make the bearings of the entire spring more firm.

When the wrist W is journaled or connected closely to the body, the arm $a'$ at or near its outer end is separated therefrom, so as to allow the said arm free spring action. When, however, the wrist W is journaled or connected to the body away from the same, as in Fig. 2, the arm $a'$ rests at or near its outer end directly against the bottom of said body. This last construction allows the arm $a'$ free spring action, and it also performs a further useful function, namely: As the load supported by the spring S is increased and the body depressed the portion of arm $a'$ that rests directly against the said body is increased, and the more the body is depressed the longer becomes the portion of arm $a'$ that will rest directly against said body.

The longer the portion of arm $a'$ is that comes in contact with and rests against the body the shorter will the flexible portion of said arm be, and the shorter the flexible portion of said arm $a'$ is the more rigid will the said arm be, and the more rigid said arm $a'$ is the stiffer will the entire spring be and the better adapted to carry a heavy load. Thus as the load is increased the flexible portion of arm $a'$ is shortened, and as a final result the entire spring is stiffened. By this construction the spring S automatically stiffens as the load increases and so adjusts itself to the weight to be carried, thus providing a spring having the same degree of elasticity be the load to be carried by said spring light or heavy. The dotted lines in Fig. 2 show the position that arm $a'$ and the entire spring will assume when the vehicle carries a heavy load.

In Fig. 3 I have shown one of my springs detached having an oscillating wrist journal or connection. As this oscillating journal or connection will allow the wrist portion W to move backward and forward, the elongation of arm $a'$ will be taken up whether the outer end of said arm $a'$ is permanently or movably connected to the body of the vehicle. When I use this oscillating journal or connection, I preferably connect arm $a'$ permanently to the body, as the said permanent connection will make the bearings of the entire spring more firm.

It will be observed that I construct the corners of the wrist W larger than the intermediate portion W' of the wrist when I make a torsion-wrist. This is essential in such a spring, for if the corners are no larger or no stronger than the other portions the spring will break at the corners or abrupt bends and the spring would be worthless; but by upsetting the corners of the wrist and leaving the intermediate portion between the said corners of smaller dimension than the corners of the wrist I can have a torsion-spring at the intermediate portion, as well as elasticity in the flexion-arms $a$ and $a'$.

Now what I claim, and for which I ask that Letters Patent of the United States be granted me, is—

1. The combination, with the body and running-gear of a vehicle, of a spring comprising a wrist portion and flexion-arms extending laterally therefrom and a support on the under side of said body, said wrist portion resting in said support and the outer end of one arm resting against the under side of said body and one of them having a loose connection with its bearing, whereby one end of said arm is free to move in the direction of the length of said arm and one end of said arm being at a distance from said body, the outer end of the other arm being connected to said running-gear, substantially as described.

2. The combination, with the body and running-gear of a vehicle, of a spring consisting of a wrist portion and two flexion-arms extending laterally therefrom and a support fastened to the under side of said body and having an open space larger than said wrist, said wrist resting in said open space, the outer end of one of said arms being against the under side of said body and the outer end of the other arm being connected to said running-gear, substantially as described.

3. A vehicle-spring consisting of a wrist having large rigid ends and an intermediate portion of less thickness, whereby said intermediate portion is susceptible of torsion, and laterally-extending arms integral with said enlarged ends, substantially as described.

HENRY TIMKEN.

Attest:
  FRANCIS VALLÉ,
  F. A. SIEFERT.